US012664200B2

(12) United States Patent
Zhuang et al.

(10) Patent No.: US 12,664,200 B2
(45) Date of Patent: Jun. 23, 2026

(54) CENTRALIZED RESOURCE MANAGEMENT FOR DISPARATE COMMUNICATION PLATFORMS

(71) Applicant: Citrix Systems, Inc., Fort Lauderdale, FL (US)

(72) Inventors: Jie Zhuang, Nanjing (CN); Ke Xu, Nanjing (CN); Zongpeng Qiao, Nanjing (CN); Xiao Zhang, Nanjing (CN)

(*) Notice: Subject to any disclaimer, the term of this patent is extended or adjusted under 35 U.S.C. 154(b) by 538 days.

(21) Appl. No.: 17/528,769

(22) Filed: Nov. 17, 2021

(65) Prior Publication Data

US 2023/0116492 A1      Apr. 13, 2023

Related U.S. Application Data

(63) Continuation of application No. PCT/CN2021/122455, filed on Sep. 30, 2021.

(51) Int. Cl.
| | |
|---|---|
| *G06F 16/3329* | (2025.01) |
| *G06F 16/332* | (2019.01) |
| *G06F 16/334* | (2025.01) |
| *G06F 16/35* | (2019.01) |
| *H04L 51/04* | (2022.01) |

(52) U.S. Cl.
CPC ...... *G06F 16/3329* (2019.01); *G06F 16/3326* (2019.01); *G06F 16/3344* (2019.01); *G06F 16/35* (2019.01); *H04L 51/04* (2013.01)

(58) Field of Classification Search
CPC .................................................... G06F 16/3329
See application file for complete search history.

(56) References Cited

U.S. PATENT DOCUMENTS

| | | | |
|---|---|---|---|
| 2010/0205541 A1* | 8/2010 | Rapaport ............... | G06Q 30/02 |
| | | | 715/753 |
| 2016/0246790 A1* | 8/2016 | Cowdrey .......... | G06F 16/24578 |
| 2018/0336207 A1* | 11/2018 | Dunne .................... | G06F 16/35 |
| 2019/0197619 A1* | 6/2019 | Ayikara Kizhakayil .................... | |
| | | | H04L 51/046 |

\* cited by examiner

*Primary Examiner* — Van H Oberly

(57) ABSTRACT

Methods, apparatuses, and systems for grouping topics for users from different communication platforms are described herein. For example, a computing device may receive, from a user and via a communication platform, a request for sending content associated with the communication platform to the computing device. The computing device may determine, based on the received request, one or more keywords from the content. In addition, the computing device may determine a topic based on the one or more keywords. In addition, the computing device may determine a similarity between the determined topic and one or more stored topics. The one or more stored topics may be associated with one or more additional users. Further, based on a determination that the similarity satisfies a threshold, the computing device may send, to the user, a message identifying the one or more additional users.

20 Claims, 12 Drawing Sheets

| Workspace | Topics 732 | Related People 733 | Date 734 | Related Files 735 |
|---|---|---|---|---|
| Home > | | | | |
| Actions > | | | | |
| Apps > | Automation | P1, P2 | 08/16/2021 | File Link 1 |
| Desktop > | Cloud Infrastructure | P3, P4, P5 | 07/20/2021 | File Folder Link 1 |
| Files > | MacOS System | P6, P7 | 07/15/2021 | File Link 2 |
| Topics > | Network Issues | P1, P8, P9 | 07/14/2021 | File Folder Link 2 |

Search Workspace

Search Topic 731

CENTRALIZED RESOURCE MANAGEMENT FOR DISPARATE COMMUNICATION PLATFORMS

CROSS-REFERENCE

This application is a continuation application of International Application No. PCT/CN2021/122455, filed Sep. 30, 2021, and entitled "Centralized Resource Management for Disparate Communication Platforms." The contents of which are hereby incorporated by reference in their entirety.

FIELD

Aspects described herein generally relate to computer networking, remote computer access, cloud computing systems, and hardware and software related thereto. More specifically, one or more aspects describe herein provide centralized resource management for disparate communication platforms.

BACKGROUND

Users often engage in peer-to-peer private discussions with other users on various communication platforms. But those discussions may not be available to the public. Thus, it may be frustrating for some users when they desire to continue the discussion of certain topics but fail to find friends or colleagues who are also interested in the same topics. For example, employees of a company might not be able to quickly and easily find a topic that has been discussed among colleagues, and might not know who is also interested in the topic.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Users generally desire to discuss topics with users who are also interested in the same topics or are experts on the topics, but often fail to find such topics or users. Even though communication platforms may allow users to search keywords on the communication platforms, the users may only find information that is available to the public. In addition, searching keywords on a communication platform may find information associated with only that communication platform, which may provide limited information. Thus, there is a need for providing a mechanism that helps users find topics that have been discussed before on various communication platforms.

To overcome the limitations described above, and to overcome other limitations that will be apparent upon reading and understanding the present specification, aspects described herein are directed towards methods and apparatuses for centralized resource management for disparate communication platforms. The centralized resource management may group topics for users from different communication platforms. In an illustrative embodiment, a method may be provided. A computing device may receive, from a user and via a communication platform, a request for sending content associated with the communication platform to the computing device. The computing device may determine, based on the received request, one or more keywords from the content. The computing device may determine a topic based on the one or more keywords. In addition, the computing device may determine a similarity between the determined topic and one or more stored topics. The one or more stored topics may be associated with one or more additional users. Further, based on a determination that the similarity satisfies a threshold, the computing device may send, to the user, a message identifying the one or more additional users.

In an illustrative embodiment, an apparatus may be provided. The apparatus may comprise one or more processors; and memory storing instructions that, when executed by the one or more processors, cause the apparatus to receive, from a user and via a communication platform, a request for sending content associated with the communication platform to the apparatus. The instructions, when executed by the one or more processors, may further cause the apparatus to determine, based on the received request, one or more keywords from the content. The instructions, when executed by the one or more processors, may further cause the apparatus to determine a topic based on the one or more keywords. The instructions, when executed by the one or more processors, may further cause the apparatus to determine a similarity between the determined topic and one or more stored topics. The one or more stored topics may be associated with one or more additional users. The instructions, when executed by the one or more processors, may further cause the apparatus to, based on a determination that the similarity satisfies a threshold, send, to the user, a message identifying the one or more additional users.

In an embodiment of the present disclosure, one or more non-transitory computer readable media may be provided to perform one or more of the processes described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 7A-7D depict example user interfaces that may be used in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Figure 1:
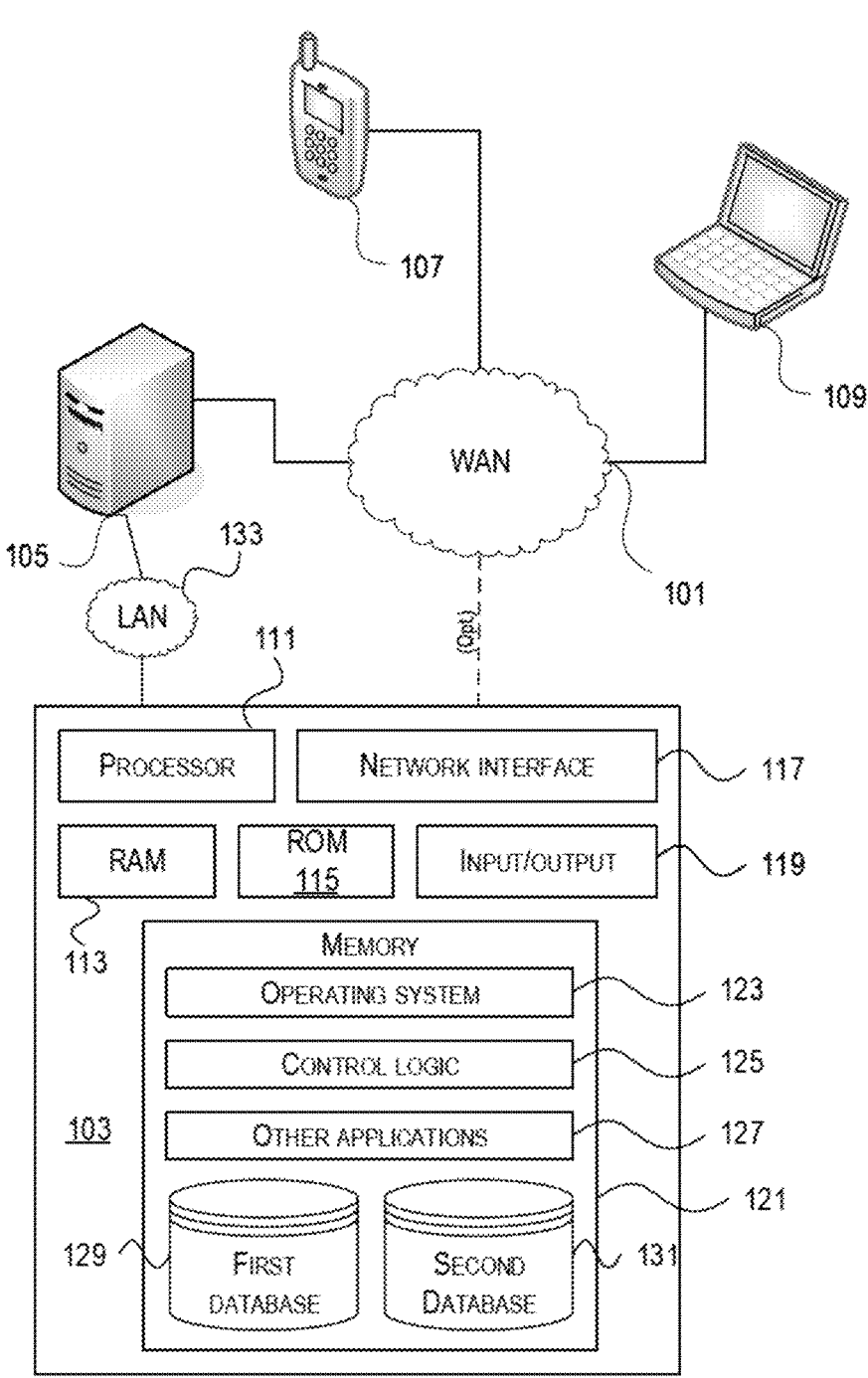
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network,"

which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with the data server 103 using remote computers 107, 109, e.g., using a web browser to connect to data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of data processing device 103, control logic 125 for instructing data server 103 to perform aspects described herein, and other application software 127 providing secondary, support, and/or other functionality which may or might not be used in conjunction with aspects described herein. Control logic 125 may also be referred to herein as data server software 125. Functionality of data server software 125 may refer to operations or decisions made automatically based on rules coded into control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, first database 129 may include second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
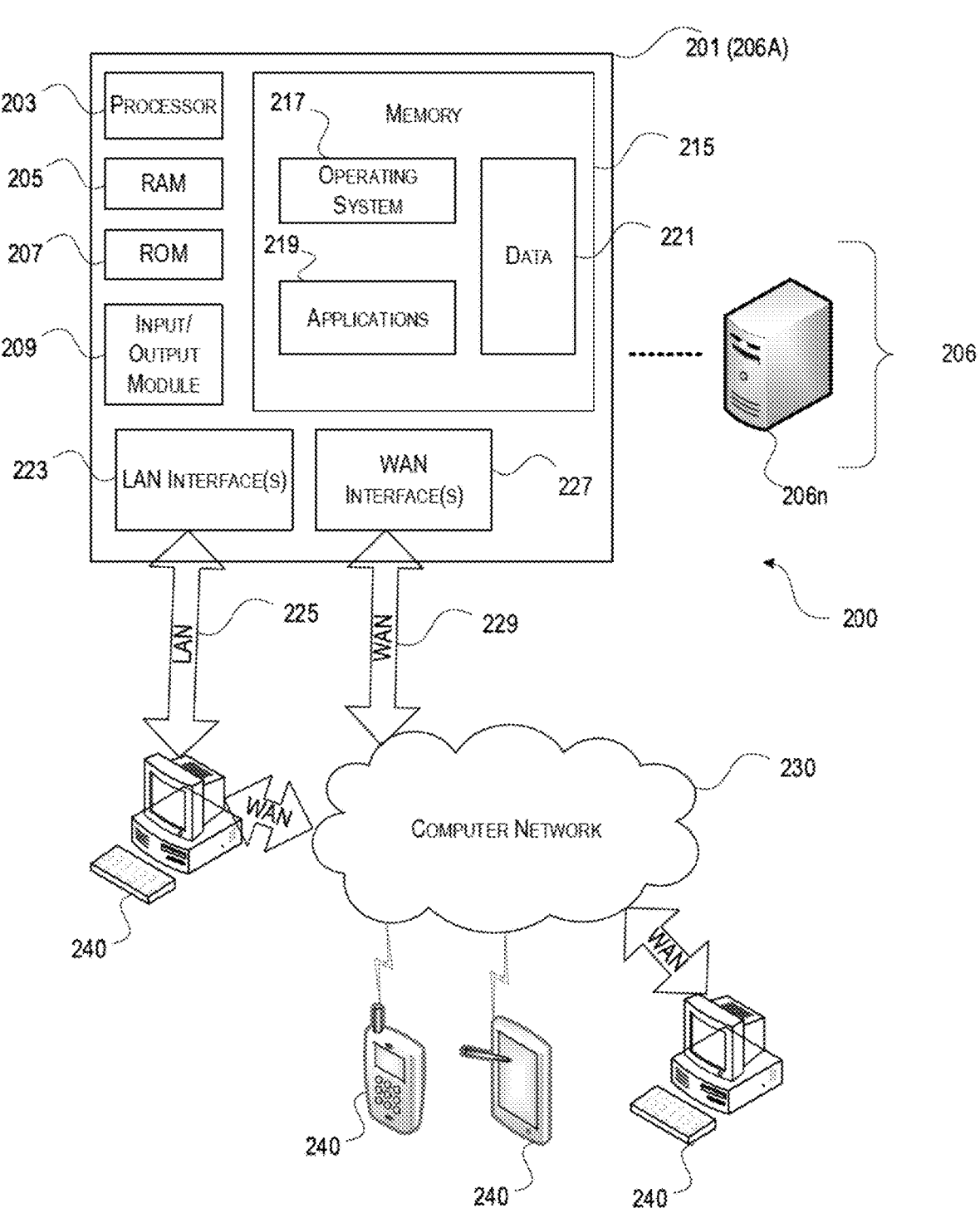
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. Computing device 201 may have a processor 203 for controlling overall operation of computing device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by computing device 201, such as an operating system 217, application programs 219, and an associated database 221.

Computing device 201 may operate in a networked environment supporting connections to one or more remote computers, such as terminals 240 (also referred to as client devices and/or client machines). Terminals 240 may be personal computers, mobile devices, laptop computers, tablets, or servers that include many or all of the elements described above with respect to computing device 103 or 201. The network connections depicted in FIG. 2 include a local area network (LAN) 225 and a wide area network (WAN) 229, but may also include other networks. When used in a LAN networking environment, computing device 201 may be connected to LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. Server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments server farm 206 may be administered as a single entity, while in other embodiments server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by client machine 240 with a response from second server 206b (not shown.) First server 206a may acquire an enumeration of applications available to client machine 240 as well as address information associated with an application server 206 hosting an application identified within the enumeration of applications. First server 206a can then present a response to the client's request using a web interface, and communicate directly with client 240 to provide client 240 with access to an identified application. One or more clients 240 and/or one or more servers 206 may transmit data over network 230, e.g., network 101.

Figure 3:
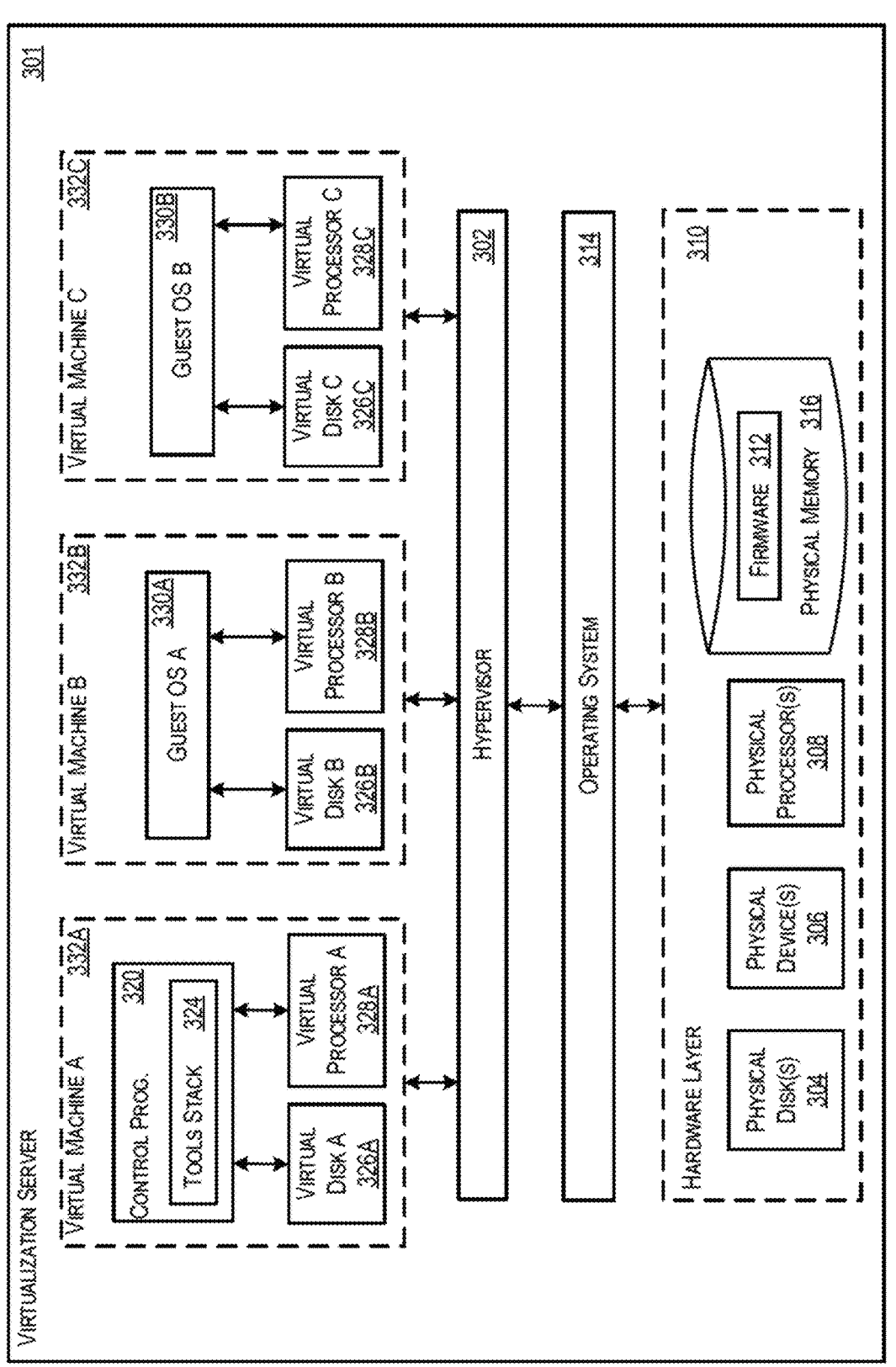
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in physical memory 316 and can be executed by one or more of physical processors 308. Virtualization server 301 may further include an operating system 314 that may be stored in a memory element in physical memory 316 and executed by one or more of physical processors 308. Still further, a hypervisor 302 may be stored in a memory element in physical memory 316 and can be executed by one or more of physical processors 308.

Executing on one or more of physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 can be executed by one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on virtualization server 301. Virtual machines may then execute at a level above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within the hardware layer 310. That is, while a Type 2 hypervisor 302 accesses system resources through a host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, can provide virtual resources to operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, Virtual Server or virtual PC hypervisors provided by Microsoft, or others. In some embodiments, virtualization server 301 may execute a hypervisor 302 that creates a virtual machine platform on which guest operating systems may execute. In these embodiments, virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to virtual machine 332.

As shown in FIG. 3, virtualization server 301 may host or execute one or more virtual machines 332. A virtual machine 332 is a set of executable instructions that, when executed by a processor 308, may imitate the operation of a physical computer such that virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include a virtual disk 326A-C (generally 326) and a virtual processor 328A-C (generally 328.) Virtual disk 326, in some embodiments, is a virtualized view of one or more physical disks 304 of virtualization server 301, or a portion of one or more physical disks 304 of virtualization server 301. The virtualized view of physical disks 304 can be generated, provided, and managed by hypervisor 302. In some embodiments, hypervisor 302 provides each virtual machine 332 with a unique view of the physical disks 304. Thus, in these embodiments, particular virtual disk 326 included in each virtual machine 332 can be unique when compared with other virtual disks 326.

A virtual processor 328 can be a virtualized view of one or more physical processors 308 of virtualization server 301. In some embodiments, the virtualized view of physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of virtual processor 328 are different than the characteristics of the corresponding physical processor 308.

Figure 4:
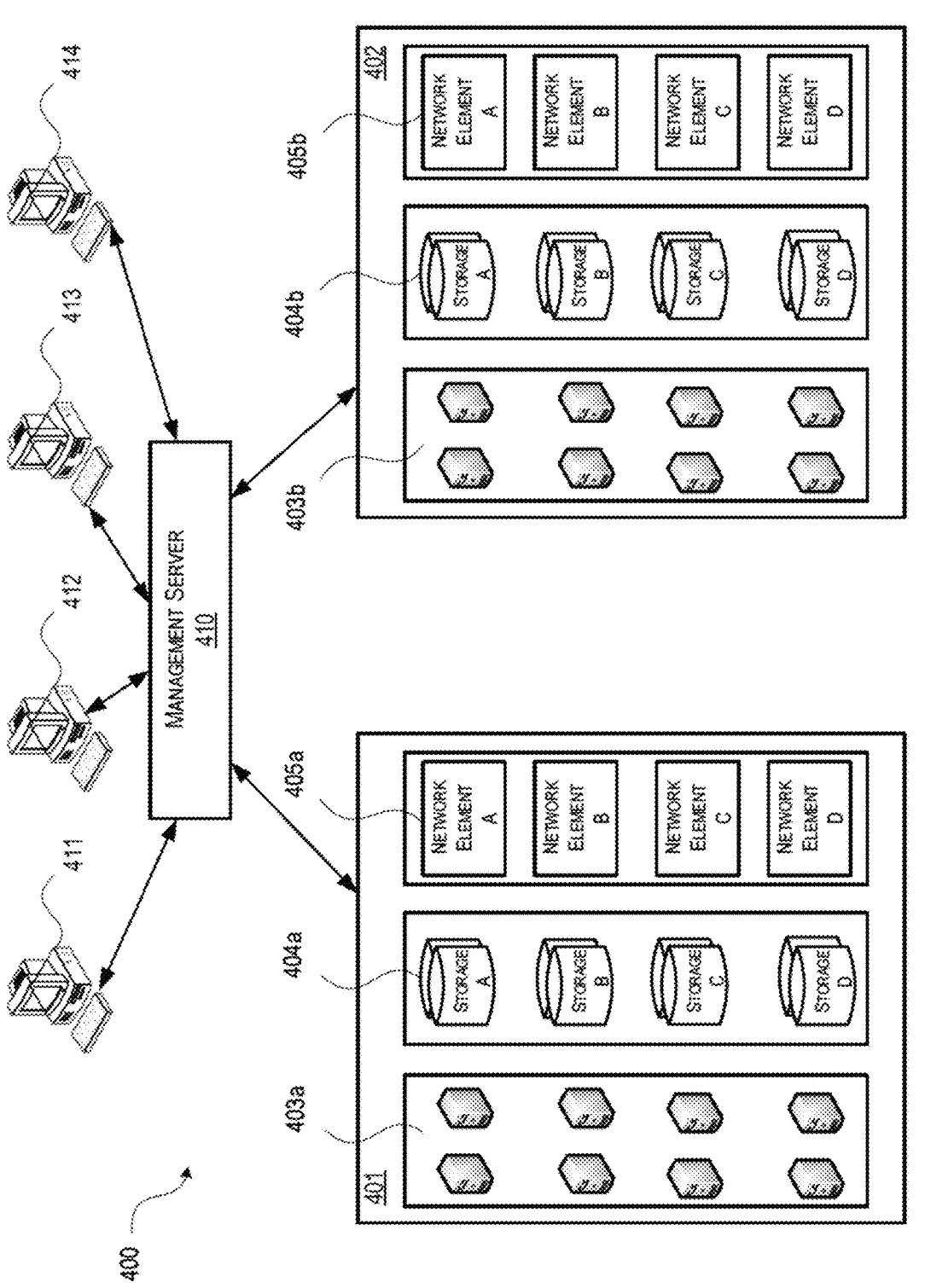
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. Management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, management server 410 may include a resource manager configured to select and provision physical resources in the hardware layer of the cloud system based on the client requests. For example, management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. Management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Figure 5A:
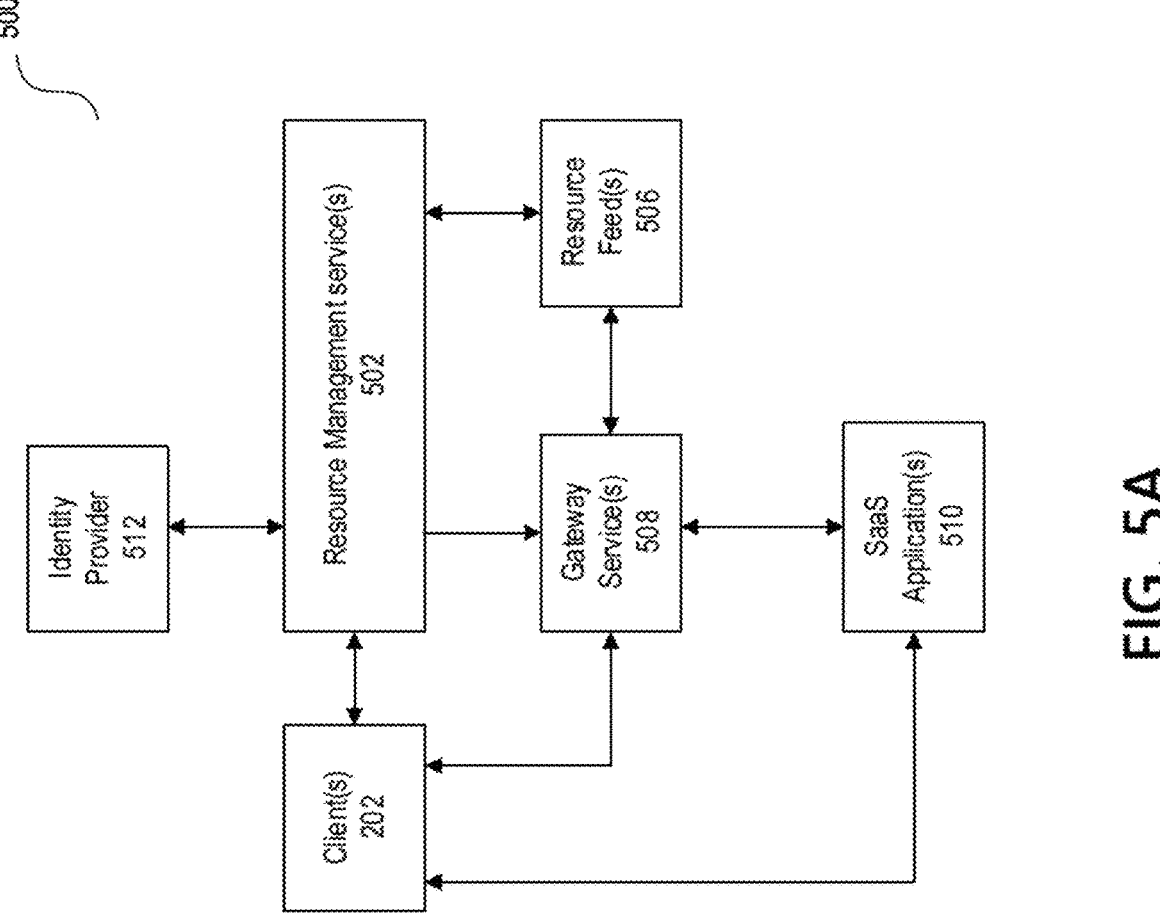
FIG. 5A is a block diagram of an example system in which resource management services may manage and streamline access by clients to resource feeds (via one or more gateway services) and/or software-as-a-service (SaaS) applications.

FIG. 5A is a block diagram of an example system 500 in which one or more resource management services 502 may manage and streamline access by one or more clients 202 to one or more resource feeds 506 (via one or more gateway services 508) and/or one or more software-as-a-service (SaaS) applications 510. In particular, resource management service(s) 502 may employ an identity provider 512 to authenticate the identity of a user of a client 202 and, following authentication, identify one of more resources the user is authorized to access. In response to the user selecting one of the identified resources, resource management service(s) 502 may send appropriate access credentials to requesting client 202, and client 202 may then use those credentials to access the selected resource. For the resource feed(s) 506, client 202 may use the supplied credentials to access the selected resource via a gateway service 508. For SaaS application(s) 510, client 202 may use the credentials to access the selected application directly.

The client(s) 202 may be any type of computing devices capable of accessing the resource feed(s) 506 and/or the SaaS application(s) 510, and may, for example, include a variety of desktop or laptop computers, smartphones, tablets, etc. The resource feed(s) 506 may include any of numerous resource types and may be provided from any of numerous locations. In some embodiments, for example, the resource feed(s) 506 may include one or more systems or services for providing virtual applications and/or desktops to the client(s) 202, one or more file repositories and/or file sharing systems, one or more secure browser services, one or more access control services for the SaaS applications 510, one or more management services for local applications on the client(s) 202, one or more internet enabled devices or sensors, etc. Each of the resource management service(s) 502, the resource feed(s) 506, the gateway service(s) 508, the SaaS application(s) 510, and the identity provider 512 may be located within an on-premises data center of an organization for which the system 500 is deployed, within one or more cloud computing environments, or elsewhere.

Figure 5B:
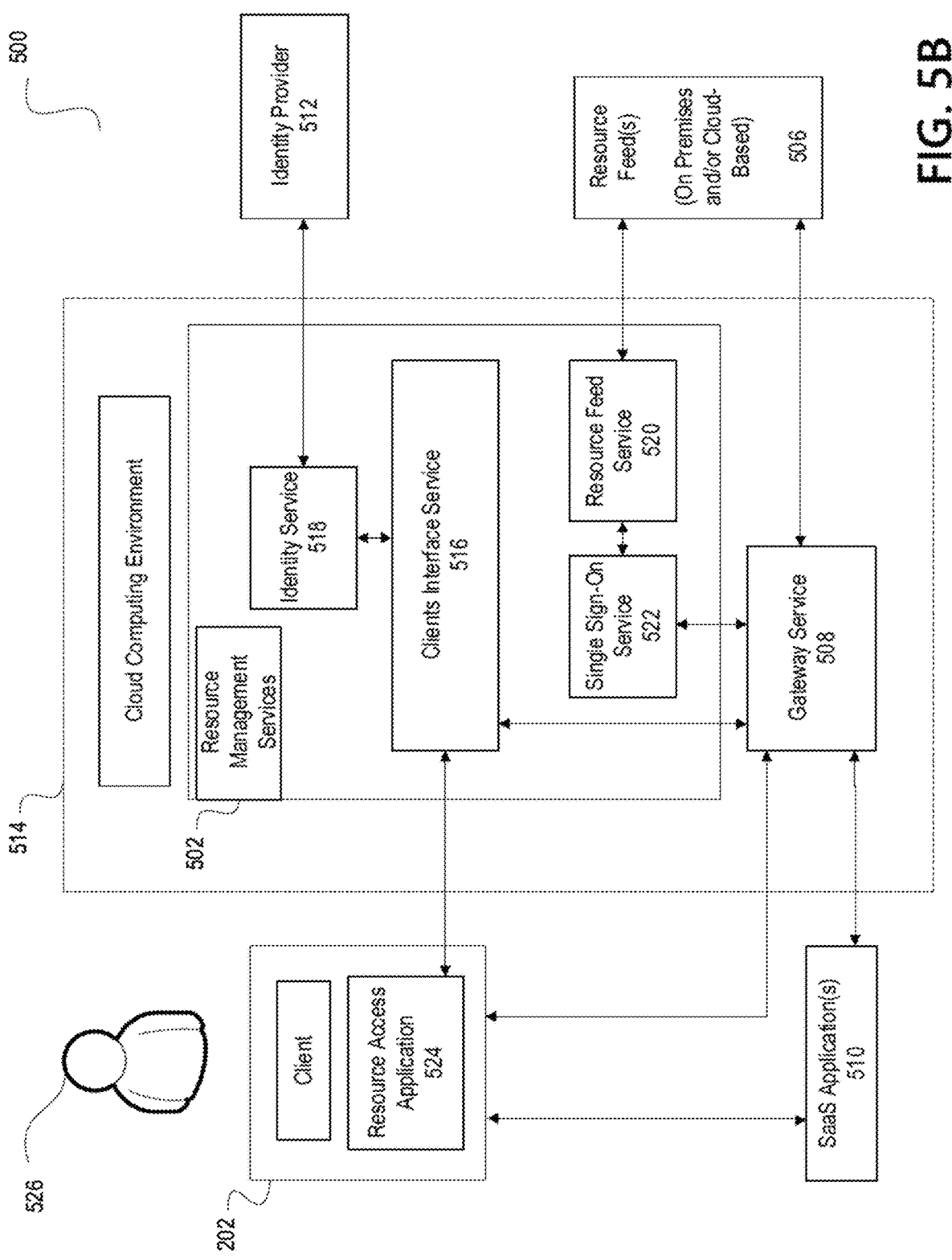
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 508 are located within a cloud computing environment 514. The cloud computing environment may, for example, include Microsoft Azure Cloud, Amazon Web Services, Google Cloud, or IBM Cloud.

For any of illustrated components (other than client 202) that are not based within cloud computing environment 514, cloud connectors (not shown in FIG. 5B) may be used to interface those components with cloud computing environment 514. Such cloud connectors may, for example, run on Windows Server instances hosted in resource locations and may create a reverse proxy to route traffic between the site(s) and cloud computing environment 514. In the illustrated example, the cloud-based resource management services 502 include a client interface service 516, an identity service 518, a resource feed service 520, and a single sign-on service 522. As shown, in some embodiments, client 202 may use a resource access application/platform 524 to communicate with client interface service 516 as well as to present a user interface on the client 202 that a user 526 can operate to access resource feed(s) 506 and/or SaaS application(s) 510. Resource access application 524 may either be installed on client 202, or may be executed by client interface service 516 (or elsewhere in system 500) and accessed using a web browser (not shown in FIG. 5B) on client 202.

As explained in more detail below, in some embodiments, resource access application 524 and associated components may provide user 526 with a personalized, all-in-one interface, enabling instant and seamless access to all the user's SaaS and web applications, files, virtual Windows applications, virtual Linux applications, desktops, mobile applications, Citrix Virtual Apps and Desktops™, local applications, and other data.

When resource access application 524 is launched or otherwise accessed by user 526, client interface service 516 may send a sign-on request to identity service 518. In some embodiments, identity provider 512 may be located on the premises of the organization for which system 500 is deployed. Identity provider 512 may, for example, correspond to an on-premises Windows Active Directory. In such embodiments, identity provider 512 may be connected to cloud-based identity service 518 using a cloud connector (not shown in FIG. 5B), as described above. Upon receiving a sign-on request, identity service 518 may cause the resource access application 524 (via client interface service 516) to prompt user 526 for the user's authentication credentials (e.g., user-name and password). Upon receiving the user's authentication credentials, client interface service 516 may pass the credentials along to identity service 518, and identity service 518 may, in turn, forward them to identity provider 512 for authentication, for example, by comparing them against an Active Directory domain. Once identity service 518 receives confirmation from identity provider 512 that the user's identity has been properly authenticated, client interface service 516 may send a request to resource feed service 520 for a list of subscribed resources for user 526.

In other embodiments (not illustrated in FIG. 5B), identity provider 512 may be a cloud-based identity service, such as a Microsoft Azure Active Directory. In such embodiments, upon receiving a sign-on request from client interface service 516, identity service 518 may, via client interface service 516, cause client 202 to be redirected to the cloud-based identity service to complete an authentication process. The cloud-based identity service may then cause client 202 to prompt user 526 to enter the user's authentication credentials. Upon determining the user's identity has been properly authenticated, the cloud-based identity service may send a message to resource access application 524 indicating the authentication attempt was successful, and resource access application 524 may then inform the client interface service 516 of the successfully authentication. Once the identity service 518 receives confirmation from client interface service 516 that the user's identity has been properly authenticated, client interface service 516 may send a request to resource feed service 520 for a list of subscribed resources for user 526.

For each configured resource feed, resource feed service 520 may request an identity token from the single sign-on service 522. Resource feed service 520 may then pass the feed-specific identity tokens it receives to the points of authentication for respective resource feeds 506. Each resource feed 506 may then respond with a list of resources configured for the respective identity. Resource feed service 520 may then aggregate all items from the different feeds and forward them to client interface service 516, which may cause resource access application 524 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®, one or more secure browsers, one or more internet enabled devices or sensors, one or more local applications installed on client 202, and/or one or more SaaS applications 510 to which user 526 has subscribed). The lists of local applications and SaaS applications 510 may, for example, be supplied by resource feeds 506 for respective services that manage which such applications are to be made available to user 526 via resource access application 524. Examples of SaaS applications 510 that may be managed and accessed as described herein include Microsoft Office 365 applications, SAP SaaS applications, Workday applications, etc.

For resources other than local applications and SaaS application(s) 510, upon user 526 selecting one of the listed available resources, resource access application 524 may cause client interface service 516 to forward a request for the specified resource to resource feed service 520. In response to receiving such a request, resource feed service 520 may request an identity token for the corresponding feed from the single sign-on service 522. The resource feed service 520 may then pass the identity token received from single sign-on service 522 to client interface service 516 where a launch ticket for the resource may be generated and sent to resource access application 524. Upon receiving the launch ticket, resource access application 524 may initiate a secure session to gateway service 508 and present the launch ticket. When gateway service 508 is presented with the launch ticket, it may initiate a secure session to the appropriate resource feed and present the identity token to that feed to seamlessly authenticate user 526. Once the session initializes, client 202 may proceed to access the selected resource.

When user 526 selects a local application, resource access application 524 may cause the selected local application to launch on client 202. When user 526 selects a SaaS application 510, resource access application 524 may cause client interface service 516 request a one-time uniform resource locator (URL) from gateway service 508 as well a preferred browser for use in accessing SaaS application 510. After gateway service 508 returns the one-time URL and identifies the preferred browser, client interface service 516 may pass that information along to resource access application 524. Client 202 may then launch the identified browser and initiate a connection to the gateway service 508. Gateway service 508 may then request an assertion from single sign-on service 522. Upon receiving the assertion, gateway service 508 may cause the identified browser on client 202 to be redirected to the logon page for identified SaaS application 510 and present the assertion. The SaaS may then contact gateway service 508 to validate the assertion and authenticate user 526. Once the user has been authenticated, communication may occur directly between the identified browser and selected SaaS application 510, thus allowing user 526 to use client 202 to access selected SaaS application 510.

In some embodiments, the preferred browser identified by the gateway service 508 may be a specialized browser embedded in resource access application 524 (when the resource application is installed on client 202) or provided by one of resource feeds 506 (when resource application 524 is located remotely), e.g., via a secure browser service. In such embodiments, SaaS applications 510 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of resource feed(s) 506) for assessment of its security risk by a web filtering service. For approved URLs, the specialized browser may be permitted to access the link. For suspicious links, however, the web filtering service may have client interface service 516 send the link to a secure browser service, which may start a new virtual browser session with client 202, and thus allow the user to access the potentially harmful linked content in a safe environment.

In some embodiments, in addition to or in lieu of providing user 526 with a list of resources that are available to be accessed individually, as described above, user 526 may instead be permitted to choose to access a streamlined feed of event notifications and/or available actions that may be taken with respect to events that are automatically detected with respect to one or more of the resources. This streamlined resource activity feed, which may be customized for each user 526, may allow users to monitor important activity involving all of their resources-SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to client 202 to notify user 526 of something that requires the user's attention (e.g., approval of an expense report, new course available for registration, etc.).

Grouping of Topics for Users from Different Communication Platforms

Aspects of the present disclosure describe a mechanism for grouping topics for users from different communication platforms. In some examples, aspects of the present disclosure describe a central computing device that receives information from different communication platforms (e.g., Slack, Microsoft Teams, Microsoft Outlook, Facebook) and identifies topics and related users based on the received information. For example, some aspects of the present disclosure describe that a user may select content (e.g., a private message) from a communication platform, and send a request (e.g., message) comprising the content to a computing device. The request may indicate that the user desires to discuss the topics related to the content with other users. The computing device may analyze the content and determine the topics and the users related to the topics. The computing device may group the determined topics with stored topics and output the grouped topics and the related users.

Further, aspects of the present disclosure describe improved user interfaces that allow users to easily indicate the desire to share content with other users and to easily find the topics of their interest and directly communicate with other users. Moreover, aspects of the present disclosure describe a computing device that is able to inform the user of other users related to the topics and/or other information related to the topics.

As illustrated in greater detail below, some aspects of the disclosure may provide technical benefits that are not provided by conventional systems. A computing device may collect and analyze content from various communication platforms. For example, one or more aspects of the disclosure describes a computing device that may directly receive content from a plurality of users via a plurality of communication platforms and output one or more topics and related users without any intervention of users, even if the content is a private message. Additionally, the computing device may automatically detect the content when other users send a request indicating that they would like to share the content with other users, by establishing communication tools that implement functionality to support the sending of the requests. In this way, users may be able to quickly and easily view the topics of their interest and directly communicate with the related users. The interaction between a plurality of communication platforms and a central computing device may significantly increase the likelihood that the users find topics of their interest and the related users for further discussion of the topics. Thus, some aspects of the disclosure may provide an improved user experience. Various other technical benefits may be achieved as well.

Figure 6:
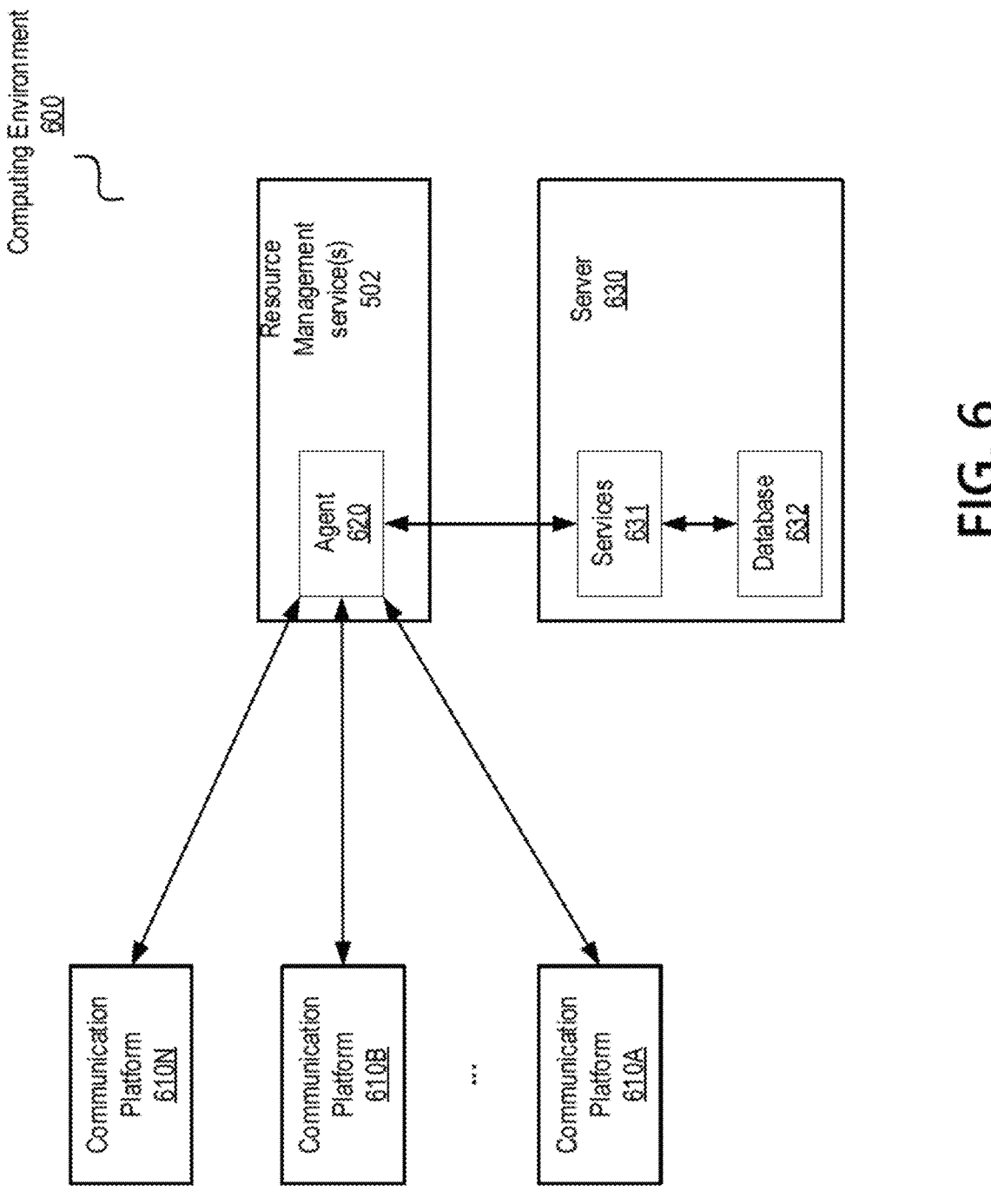
FIG. 6 is a block diagram showing an example implementation of a computing environment that may be used in accordance with one or more illustrative aspects described herein.

FIG. 6 is a block diagram showing an example implementation of a computing environment that may be used in accordance with one or more illustrative aspects described herein. In FIG. 6, a computing environment 600 may comprise a plurality of communication platforms 610A-610N. One or more of the communication platforms 610A-610N may be a communication software, communication application, and/or communication service that enables and/or facilitates external and/or internal messaging among users. Examples of communication platforms may comprise Slack, Microsoft Teams, Microsoft Outlook, Facebook, and/or other communication software or applications. A communication platform may only allow communication within the communication platform and may not directly communicate with a different communication platform. As a result, messages received within a communication platform might not be accessible or otherwise available for other communication platforms.

A first user of a communication platform 610A may communicate with a second user of the same communication platform 610A via a network (e.g., the wide area network 101). The first user may send private content (e.g., content that can be seen only by the first user and the second user) to the second user. The first user may also send semi-private content to the second user. For example, the first user and the second user may belong to a same group and the first user may send content to the second user or to the group in a private chat room. The private chat room may include the first user, the second user, and/or other users. The content may be of interest to the first user and/or the second user. The content may be a message or any other recorded communication sent to or left for a recipient. The content may comprise one or more sentences. Each of the sentences may comprise a plurality of words.

The computing environment 600 may comprise a computing device (e.g., the resource management service 502) that may receive content sent within the communication platforms 610A-610N. For example, the resource management service 502 may comprise an agent 620 that is configured to receive content from one or more of the communication platforms 610A-610N.

The agent 620 may be a virtual delivery agent (VDA) that establishes and/or manages the connection between the communication platforms 610A-610N and a computing device (e.g., the resource management service 502). The agent 620 may be installed on a physical or virtual machine in the computing environment 600. The agent 620 may also establish and manage the connection between the resource management service 502 and the user devices (e.g., the client 202).

The agent 620 may provide interfaces for communication tools to send content from one or more of the communication platforms 610A-610N. The communication tools may implement functionality to support the sending of the content to the agent 620. Various protocols may be used to define how applications (e.g., one of the communication platforms 610A-610N and the resource management service 502) can connect to and communicate with each other. For example, the agent 620 may obtain content via representational state transfer (REST) APIs (e.g., REST or RESTful web APIs). When a user desires to share content in one of the communication platforms 610A-610N, the user may send a request (e.g., an HTTP request) for sending content associated with the communication platform to a computing device (e.g., an application different from the communication platform, the resource management service 502). The request may indicate that the content can be sent to the computing device and/or analyzed by the computing device. The request may comprise the content itself. After the user sends the request, the agent 620 may receive the request and/or the content.

The computing environment 600 may comprise a server 630 (e.g., the data server 103, the web server 105, the server 206). The resource management service 502 may be integrated into the server 630. The server 630 may comprise a service module 631 and a database 632 (e.g., the first database 129, the second database 131). The agent 620 may send the received request and/or content to the server 630. For example, the service module 631 may receive the request and/or the content from the agent 620 and may analyze the content. The service module 631 may identify keywords from the content. The service module 631 may be associated with a subset of users related to the topic "automation" and or a subset of files related to the topic "automation."

The database 632 may comprise one or more tables for storing the information. As shown below, Table A is an example table stored in the database 632. Additional features may be added to Table A, and the features in Table A may be replaced with other features.

TABLE A

| Id | Topic ID | Topic | Related users | Date | Related file | Communication Platform |
|---|---|---|---|---|---|---|
| 1 | 001 | Automation | P1, P2 | Aug. 16, 2021 | https://citrix.sharefile.com/a-bcd | Slack |
| 2 | 002 | Cloud infrastructure | P3, P4, P5 | Jul. 20, 2021 | https://citrix.sharefile.com/a-abcde | Workspace |
| 3 | 003 | MacOS System | P6, P7 | Jul. 15, 2021 | https://citrix.sharefile.com/a-abcdef | Microsoft Teams |
| 4 | 004 | Network Issues | P1, P8, P9 | Jul. 14, 2021 | https://citrix.sharefile.com/a-abcdefg | Facebook | determine one or topics and/or sub-topics (e.g., subject matter within content) based on the keywords. The services module 631 may query the database 632 and determine whether the database 632 stores a similar topic and/or sub-topic. Based on a determination of whether the database 632 stores a similar topic and/or sub-topic, the server 630 may determine whether to merge (e.g., group) the determined one or more topics into one or more stored topics.

The agent 620 may receive the analyzed result from the server 630. The analyzed result may comprise one or more determined topics associated with the content that is received by the agent 620. The analyzed result may comprise additional information associated with the one or more determined topics. The agent 620 may render the analyzed result on a user interface. For example, if the agent 620 receives a user input indicating a desire to view the existing topics, the agent 620 may request the services module 631 to read data (e.g., topics) from the database 632 and render the data (e.g., topics, related users, dates, related files, and/or other information) on a user interface. Additional details of the user interface will be further described in connection with at least FIG. 7B.

The database 632 may store information associated with the topics. The information may be stored in a single database, or separated into different logical, virtual, or physical databases. For example, the information may comprise an identifier for an entry in the database 632 (e.g., a number indicating an entry), topics that have been previously discussed, information of the users related to the topics (e.g., names of the users, user IDs, user contact information), topic identifiers (e.g., a number identifying a topic), dates and/or times associated with the discussion of the topics, files related to the discussion of the topics (e.g., links to the files stored associated with the computing environment 600, links to the local and shared files, links to websites), information indicating a communication platform via which the discussion of the topic occurred, and/or other information associated with the topics. In addition, the information associated with sub-topics of a topic may be included in the information associated with the corresponding topic. For example, if the topic is "automation" with a topic ID 001, a sub-topic of the topic "automation" may be "car automation" and may have a sub-topic ID 001A. The sub-topic may The server 630 may obtain the files related to the topics from the users. For example, when a user sends a request for sending content to a computing device (e.g., the server 630), the user may, in the request, indicate the file information related to the content (e.g., the file name, file location, file size, file creator, file authorization). The user may also, for example, send a message (e.g., different from the request) to the computing device comprising the file information. Additionally or alternatively, the server 630 may retrieve the file information based on the content. For example, the server 630 may search for related files in a database (e.g., the first database 129, the second database 131, the database 632) that associates files with users and/or topics. For example, employees of a company may share an internal file management system (e.g., an enterprise document management system (EDM), the server 630), which may store and manage files related to various users and/or topics. When a first employee sends a request for sending content to the server 630, the server 630 may identify one or more topics related to the content and search for related files on a company's internal file management system. The server 630 may associate the files with the identified topics and store the association in the database 632.

Figure 7A:
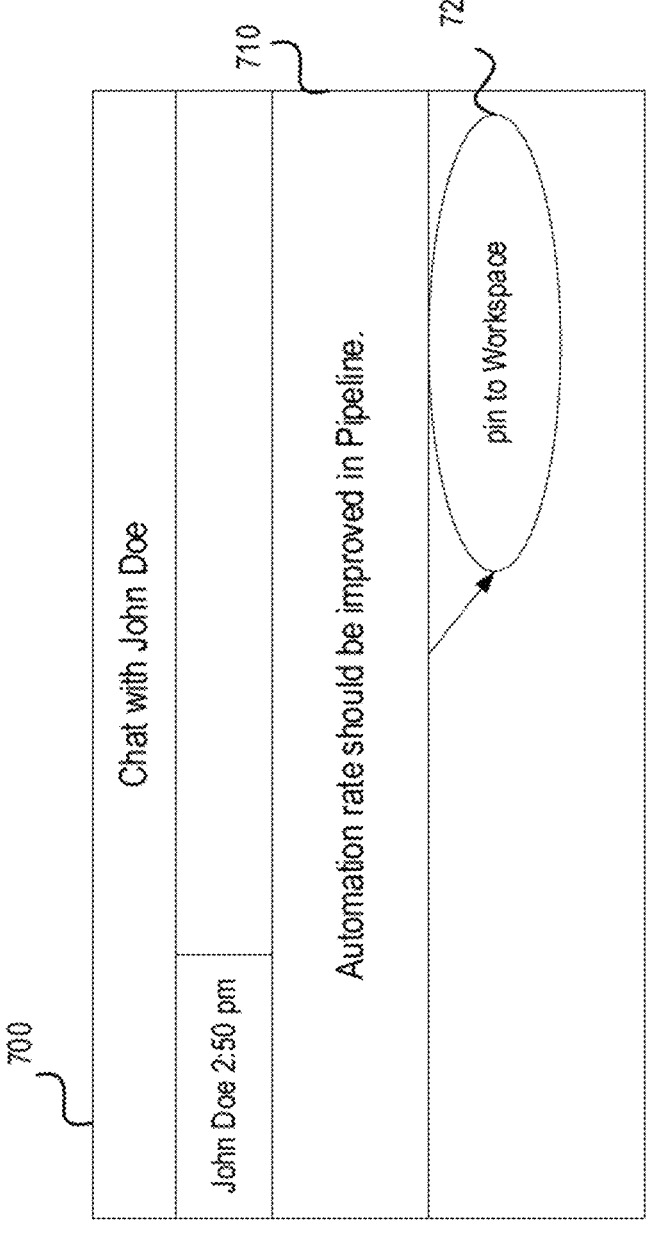

FIGS. 7A-7D depict example user interfaces that may be used in accordance with one or more illustrative aspects described herein. By designing user interfaces such as those shown in FIGS. 7A-7D, users may search topics of their interest on a computing device that collects various topics associated with a plurality of users across a plurality of communication platforms. Additionally, users may find topics, related users, related files, and/or the dates using those user interfaces. The user interfaces may have different appearances from those shown in the figures herein, depending upon the implementations thereof. In FIG. 7A, a user interface 700 may comprise a message (e.g., discussion, chat) 710 between a first user and a second user (e.g., John Doe). The second user may send content ("Automation rate should be improved in Pipeline") to the first user. The first user (or the second user) may send a request 720 (e.g., notification) to a recipient (e.g., the server 630, or any other computing device). The request 720 may indicate that the first user is interested in a topic related to the content (e.g., automation) and desires to discuss with other users with respect to the topic. The request may comprise the content. The request may also indicate a recipient of the request. The first user may be associated with the recipient (e.g., registered with the recipient, has an account with the recipient) that receives the request. For example, in FIG. 7A, the first user may select "Workspace" as the recipient of the request. The "Workspace" may be an application (e.g., the resource access application 524) that is associated with the server 630. For example, the "Workspace" application may be a computing software configured to perform specific tasks and may be, for example, a remote desktop application. The "Workspace" application may be a software platform that allows users to remotely access and use virtual resources (e.g., a virtual desktop, a virtual application). The application may also comprise virtual applications and web-based applications. The first user and/or the second user may be associated with the application.

To send a request to a recipient, a user may, for example and as shown in FIG. 7A, select (e.g., highlight or otherwise select) the content and send a request to a recipient, by, for example, selecting a float pin button such as a "pin to Workspace" option (e.g., click on a notification such as pressing a "select," "enter," or "yes" button). In an example, a user may right-click the content and select "pin to Workspace." The selection of "pin to Workspace" may send a request to Workspace. A user may use any other ways (e.g., shortcuts) for the selection of the content or sending of the request. A user may also customize the selection of the content or sending of the request based on the user's own preferences.

FIG. 7B depicts an example user interface 730 for searching and displaying topics of users' interest and/or other information. The user interface 730 may be associated with the computing device (e.g., Workspace and/or other application) that receives requests from users. Options that may be provided in a menu or other user interface are not limited to the options shown in FIG. 7B, and other options may also or alternatively be displayed on the user interface 730. The user interface 730 may be a menu-based system that provides a variety of options associated with the features for user selection.

The user interface 730 may comprise a "Topics" tab 740. The user interface 730 may output (e.g., display, present) topics 732, for example, after a user selects the "Topics" tab 740. The topics 732 may be stored in a database (e.g., the database 632). The topics 732 may be selected based on a plurality of criteria (e.g., policies, rules). For example, the topics 732 may be determined based on when the discussion of the topics occurred. The topics 732 may be ranked and output in the order of the dates associated with the discussion of the topics. As another example, the topics 732 may be determined based on one or more preferences of the user. A computing device may store the topic preferences of the user (e.g., a user may be more interested in certain topics). The computing device may select the interested topics from the stored topics and display the selected topics for the user. The computing device may also select the topics from the stored topics based on the user's relationship with the related users of the topics. For example, if the computing device determines that the user and P1 are in the same department (e.g., group, team) of a company or otherwise are in a close relationship (e.g., work on the same project), the computing device may rank the topics that have been discussed by P1 higher than other topics. The computing device may determine the user's relationship with the related users of the topics by, for example, retrieving information from a database (e.g., the database 632) indicating the relationship between the user and other users associated with the computing device.

The user interface 730 may comprise information indicating related users 733 (e.g., users that are related to each of the topics 732). The related users 733 may comprise the names of the users, user IDs associated with the users, and/or other information indicating the identifies or contact information of the users. For example, as shown in FIG. 7B, P1 and P2 are related to the topic "automation." P1 and P2 may be the names of the users who have previously discussed the topic "automation," and sent one or more requests to the computing device indicating content that comprises automation. Additionally or alternatively, P1 and P2 may be user IDs that are associated with the users, which allows certain users to send direct messages to them based on the user IDs.

The user interface 730 may comprise information indicating the dates 734 on which the topics 732 were discussed. Users may set preferences associated with the user interface 730 based on the dates 734. For example, a user may determine to output only the topics that have been discussed within a certain time period (e.g., last 30 days, last 60 days) because, for example, other users might no longer be interested in the topics if they discussed the topics a long time ago. The user interface 730 may comprise related files 735 (e.g., files that are associated with the topics 732). The related files 735 may comprise links to the files stored associated with the computing environment 600, links to the local and shared files, and/or links to websites.

Figure 7C:
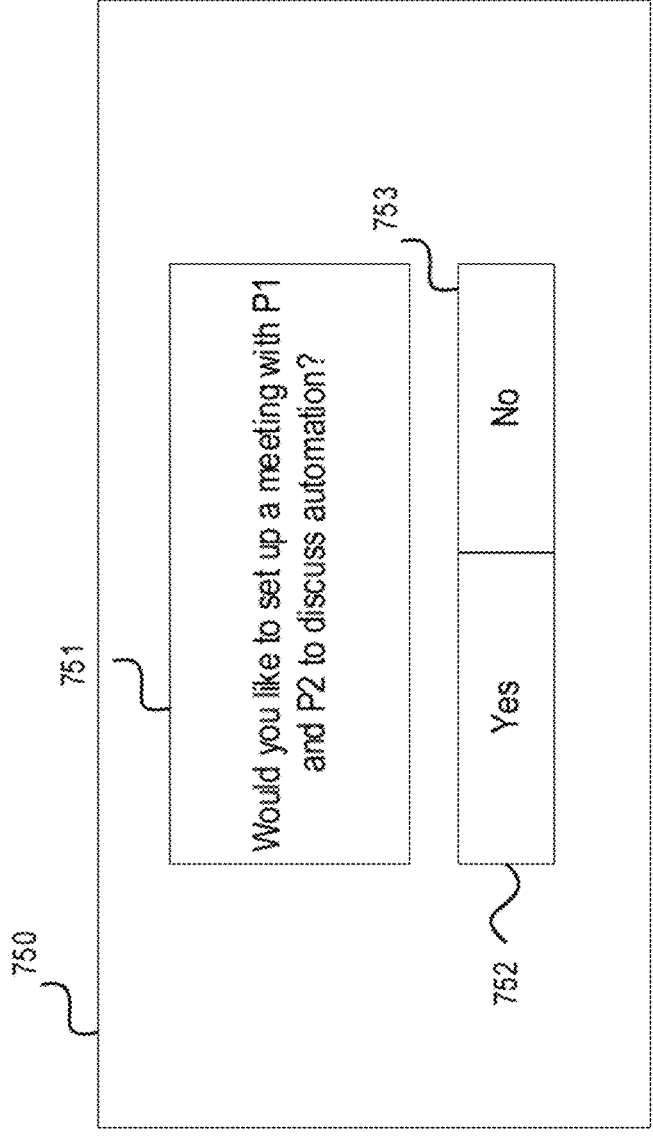

FIG. 7C depicts an example user interface 750 for communicating with one or more users that may be used in accordance with one or more illustrative aspects described herein. The user interface 750 may comprise (e.g., output) a notification 751 (e.g., a message) that invites or otherwise asks whether a user would like to communicate with one or more other users (e.g., the related users 733). For example, as shown in FIG. 7C, the notification 751 may comprise a question—"Would you like to set up a meeting with P1 and P2 to discuss automation?" The user interface 750 may comprise options 752 and 753, which allow a user to respond to the invitation (e.g., accept or deny the invitation). The notification 751 may be output after a user selects one of the topics 732. The user may select a subset of related users to establish communication (e.g., set up a meeting). After the user accepts the invitation, the computing device may send a message to the related users. For example, if a user selects the topic "automation," and desires to discuss the topic with only P1, the user may choose P1 via the user interface 730 may send a message directly to P1.

Figure 7D:
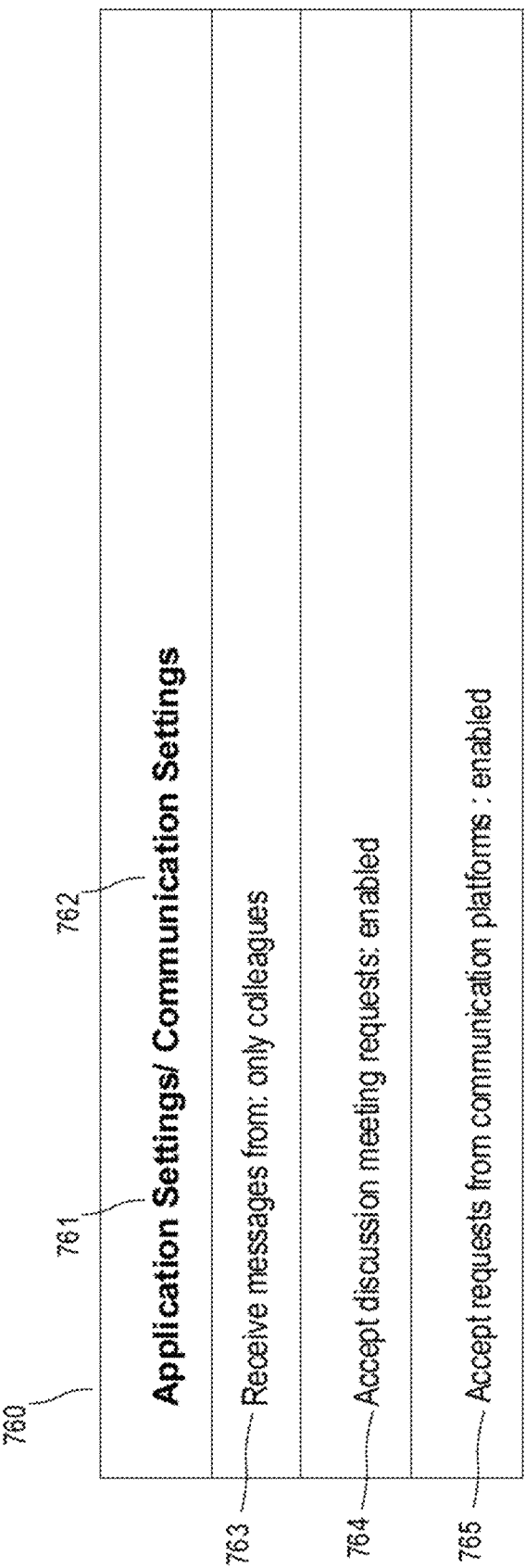

FIG. 7D depicts an example user interface 750 for communicating with one or more users that may be used in accordance with one or more illustrative aspects described herein. In FIG. 7D, one or more lists of selectable options may be arranged vertically on the user interface 750. Other types of layouts of the options, such as horizontally arranging the options, may also or alternatively be presented on the user interface 750. The user interface 750 may have multiple levels of hierarchies and the user interface 750 is an example level of hierarchies. Additional levels (e.g., lower levels) of the user interface 750 may be available for additional options related to the application settings. Options that may be provided in a menu or other user interface are not limited to the options shown in FIG. 7D, and other options may also or alternatively be displayed on the user interface 750. The user interface 750 may be a menu-based system that provides a variety of options associated with the application and/or communication features of a computing device (e.g., the server 630) for user selection. The user interface 750 may be part of one or more configuration/set-up interface for applications that are downloaded and/or installed.

In FIG. 7D, a user interface 760 may comprise an option 761 for application settings. The option 761 may be selected to set, modify, and/or otherwise configure settings related to an application (e.g., a remote desktop application). The 761 may comprise settings that control and/or otherwise relate to the communication and/or privacy features of the application. The user interface 760 may comprise an option 762 for communication settings. The option 762 may comprise options that can be selected to set, modify, and/or otherwise configure settings related to the use of the application executable on a computing device. For example, the user interface 760 may comprise an option 763 that a user may select methods and/or preferences for receiving messages (e.g., private chat messages). For example, the option 763 may allow a user to receive messages from only colleagues, only friends (e.g., users that are mutually agreed to be connected or otherwise linked), and/or everyone.

The user interface 760 may comprise an option 764 that a user may select to enable or disable receipt of discussion meeting requests (e.g., the notification 751). If the discussion meeting requests feature is disabled, other users might not be able to send discussion requests to the user. If the discussion meeting requests feature is enabled, the user may receive the discussion meeting requests. In some examples, a user may set, modify, and/or otherwise configure which users or user groups can send discussion meeting requests to the user.

The user interface 760 may comprise an option 765 that a user may select to enable or disable receiving requests (e.g., the request 720) from communication platforms (e.g., the communication platforms 610A-610N). If the receiving requests from communication platforms feature is disabled, a computing device might not receive any request from communication platforms. In addition, the user might not send a request to the computing device comprising content that the user would like to discuss. For example, no option for sending such a request may be output when a user selects content. If the receiving requests from communication platforms feature is enabled, a computing device may receive requests from communication platforms. For example, a request (e.g., the request 720) to send content to the computing device may be output when a user selects the content, which allows the user to indicate a request to discuss a topic associated with the content. The user interface 630 may also comprise an option that a user may set, modify, and/or otherwise configure the method of sending the requests to the computing device. For example, a user may set, modify, and/or otherwise configure how the request is shown on a user interface associated with one of the communication platforms 610A-610N. For example, a user may configure a shortcut for outputting the request after the user selects content. The user interface 760 may comprise various other options that allow users to set, modify, and/or otherwise configure settings related to an application.

Figure 8:
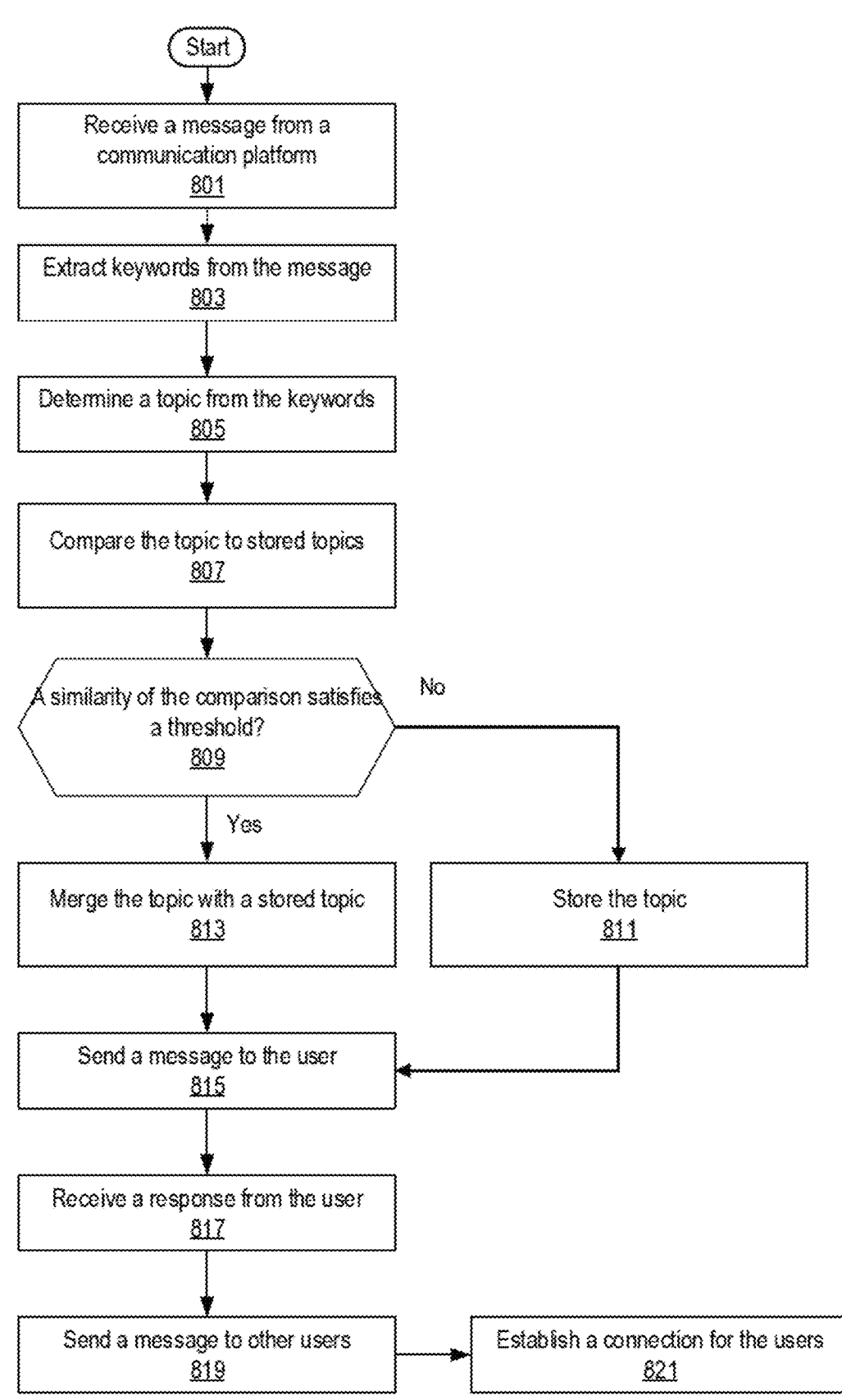
FIG. 8 depicts a flowchart showing an example method for grouping topics for users from different communication platforms that may be used in accordance with one or more illustrative aspects described herein.

FIG. 8 depicts a flowchart showing an example method for grouping topics for users from different communication platforms in accordance with one or more illustrative aspects described herein. The example method may be performed, for example, by one or more computing devices such as the server 630. The steps of the example method are described as being performed by particular computing devices for the sake of simplicity, but the steps may be performed by any other computing device.

In FIG. 8, at step 801, a computing device may receive a request from a communication platform (e.g., the communication platforms 610A-610N). The request may comprise an indication to share content (e.g., one or more private messages) with the computing device. The request may also comprise the content itself. For example, as shown in FIG. 7A, a user may select content on a user interface of a communication platform and send the request 720 to a computing device.

At step 803, the computing device may determine keywords (e.g., one or more words or phrases) from the request. For example, the computing device may determine (e.g., extract, parse) keywords from the content. Pre-processing of the content may be performed to normalize the content before performing other actions on the content. For example, pre-processing of the content may comprise removing articles, transition words and the like that are likely to be non-descriptive in nature. Various algorithms may be used to determine keywords from one or more sentences. For example, the computing device may use a topic model such as Latent Dirichlet Allocation (LDA) algorithm to determine keywords from one or more sentences. Various other methods may be used to determine keywords from the request.

At step 805, the computing device may determine one or more topics from the keywords. For example, a keyword may correspond to one topic. In another example, multiple keywords may correspond to one topic, and/or one topic and one sub-topic. The computing device may use, for example, the LDA algorithm to automatically classify and determine how relevant each keyword is to each of the determined topics and determine one or more topics based on the relevance of the keywords.

The computing device may determine one or more sub-topics from the keywords. For example, the computing device may determine that a first keyword is associated with a second keyword and that the first keyword may indicate a subset of subject matter of the second keyword. The first keyword may be comprised in a first sentence of the content, and the second keyword may be comprised in the first sentence or a second sentence of the content. For example, if the first keyword is "application software" and the second keyword is "software," the computing device may determine that "software," indicated by the second keyword, is a topic, and that "application software" indicated by the first word overlaps with the second keyword and is a sub-topic of the topic "software."

At step 807, the computing device may compare the determined topics to stored topics. The computing device may be associated with a database (e.g., the database 632) that stores one or more topics and sub-topics (e.g., the topics that were previously determined based on steps 801-805). The database may store information associated with each of the stored topics. The computing device may determine the similarity between the determined one or more topics and the stored topics in the database. Similarly, the computing device may determine the similarity between the determined one or more sub-topics and one or more stored sub-topics stored in the database. For example, the computing device may use a model (e.g., a machine learning model) to calculate the similarity between the determined one or more topics and the stored topics. The computing device may determine the determined one or more topics and the stored topics to be the input of the model and output the similarity between the determined one or more topics and the stored topics. The computing device may use, based on one or more algorithms (e.g., Word2vec algorithm), pre-trained word vectors to convert the determined one or more topics and the stored topics to different vectors (e.g., 300-dimension vectors), and use these vectors to calculate the similarity between the determined one or more topics and the stored topics. For example, the computing device may map the topics into vectors using Word2vec by mapping the determined one or more topics into 300-dimension vectors and mapping the stored topics into different 300-dimension vectors.

The computing device may calculate the similarity between the determined one or more topics and the stored topics. For example, the computing device may use a cosine similarity algorithm to calculate the similarity. An exemplary cosine similarity formula that measures the cosine of the angle between two vectors is described as below:

$$\cos\theta = \frac{\sum_{i=1}^{n} Ai \times Bi}{\sqrt{\sum_{i=1}^{n}(Ai)^2} \times \sqrt{\sum_{i=1}^{n}(Bi)^2}} = \frac{A \cdot B}{|A| \times |B|}$$

In the above cosine similarity formula, A and B may represent two vectors, and $A_i$ and $B_i$ may be components of vector A and vector B respectively. The cosine similarity formula may be used to calculate, for each determined topic, a similarity between the determined topic and one or more the stored topics and determine a similarity score. For example, the computing device may convert each of the determined one or more topics into a vector (e.g., 300-dimension vector). Each stored topic may correspond to a sample vector (e.g., a sample 300-dimension vector): {topic [Vs1], samples1: [VsA], samples2: [VsB], . . . }. The computing device may calculate the similarity between each of the vectors associated with a determined topic and each of sample's vector, and obtain a similarity score (e.g., a matching percentage) for each pair: {COS A: [Vs1, VsA], COS B: [Vs1, VsB], . . . }.

At step 809, the computing device may determine whether any of the similarity scores satisfies a threshold (e.g., 80%). If the computing device determines that none of the similarity scores satisfies a threshold (e.g., each of the similarity scores is below a threshold), step 811 may be performed. If the computing device determines that at least one of the similarity scores satisfies a threshold (e.g., the similarity score determined based on a comparison of a determined topic and at least one stored topic is above a threshold), step 813 may be performed.

At step 811, if none of the similarity scores satisfies a threshold, the computing device may store the determined one or more topics. For example, the computing device may add the determined one or more topics to a table (e.g., a list) of stored topics, and allow users to search the determined one or more topics, for example, via an input on a user interface (e.g., the user interface 730).

At step 813, if at least one of the similarity scores satisfies a threshold, the computing device may merge the determined one or more topics with a selected stored topic. The computing device may determine the most similar topic by, for example, selecting a stored topic based on the highest similarity score. For example, if the computing device determines that the similarity score of a determined topic and multiple stored topics satisfies a threshold, the computing device may select a stored topic with the highest score. The computing device may group the determined one or more topics and the selected stored topic into one topic. Because the determined one or more topics are similar to at least one of the stored topics based on the similarity score, it may be unnecessary to store the determined one or more topics as separate topics in a database. The computing device may merge the determined one or more topics with the most similar stored topic (e.g., the selected topic).

At step 815, the computing device may send a message to the user. The message may indicate that one or more users have discussed the same or similar topic that is associated with the content previously sent to the computing device. The message may comprise information for contacting the one or more users. The message may ask whether the user desires to communicate with those users. For example, as shown in FIG. 7C, a message such as the notification 751 asks whether the user desires to set up a meeting with other users.

At step 817, the computing device may receive a response from the user. The computing device may receive a response from the user indicating that the user desires to communicate with other users. The response may comprise the preferred method (e.g., email, a communication platform, a private chat room) and/or date for communicating with other users. Alternatively, the computing device may receive a response from the user that the user does not wish to communicate with other users.

At step 819, the computing device may send a message to other users. The message may be an invitation to discuss the topic with the user. In some examples, the computing device may send a message to other users even if no response is received from the user. For example, the computing device may store user preferences for automatically setting up meetings with other users after the user sends a request to the computing device. In some examples, the computing device may send a message to other users if the computing device receives a response from the user indicating that the user desires to communicate with other users. The message may be sent in the form of an email, an in-app message, a text message, and/or other forms indicating that the user desires to communicate with other users. The message may comprise the topic that the user desires to discuss, a proposed date and/or time for the discussion, a proposed communication platform for the discussion, files related to the topic, and/or other information associated with the discussion.

At step 821, the computing device may establish a connection between the user and other users. For example, if the computing device receives a response from the other users that the other users accept the invitation to discuss the topic with the user, the computing device may set up a meeting (e.g., a virtual meeting), via the computing device or another computing device, for the user and the other users. The computing device may set up the location and/or date and time of the meeting based on the preference of the user or of the other users (e.g., privacy settings 762). In this way, the user may easily communicate with other users to discuss topics of their interest. If the other users deny the invitation or do not enable certain features associated with the computing device (e.g., disable the "accept discussion meeting requests" option 764), no connection may be established between the user and the other users. The computing device may send a message to the user indicating that the invitation is denied.

The following paragraphs (M1) through (M7) describe examples of methods that may be implemented in accordance with the present disclosure.

(M1) A method comprising: receiving, by a computing device and from a user and via a communication platform, a request for sending content associated with the communication platform to the computing device; determining, based on the received request, one or more keywords from the content; determining a topic based on the one or more keywords; determining a similarity between the determined topic and one or more stored topics, wherein the one or more stored topics are associated with one or more additional users; and based on a determination that the similarity satisfies a threshold, sending, by the computing device and to the user, a message identifying the one or more additional users.

(M2) A method may be performed as described in paragraph (M1) further comprising merging, based on the determination that the similarity satisfies the threshold, the determined topic and the one or more stored topics into a discussion topic, wherein the message indicates the discussion topic.

(M3) A method may be performed as described in either paragraph (M1) or (M2), wherein the content comprises a private discussion message associated with the communication platform, and the method further comprises: receiving a plurality of private discussion messages from a plurality of users via a plurality of communication platforms; and determining one or more topics based on the plurality of private discussion messages.

(M4) A method may be performed as described in any of paragraphs (M1) through (M3), wherein the message comprises a request for communicating with the one or more additional users, and the method further comprises: based on a response to the request for communicating with the one or more additional users, sending, to the one or more additional users, a message comprising the content and information of the user.

(M5) A method may be performed as described in any of paragraphs (M1) through (M4), wherein the message comprises a request for communicating with the one or more additional users, and the method further comprises: based on a response to the request and preferences of the one or more additional users, establishing a connection between the user and the one or more additional users.

(M6) A method may be performed as described in any of paragraphs (M1) through (M5), wherein the content comprises at least two sentences associated with the user, and the method further comprises: determining a sub-topic based on the at least two sentences; and determining a similarity between the determined sub-topic and one or more stored sub-topics.

(M7) A method may be performed as described in any of paragraphs (M1) through (M6) further comprising: based on a determination that the similarity does not satisfy the threshold, storing the determined topic and causing output of a notification to the user, wherein the notification indicates that the request is received.

The following paragraphs (A1) through (A7) describe examples of apparatuses that may be implemented in accordance with the present disclosure.

(A1) An apparatus comprising one or more processors; and memory storing instructions that, when executed by the one or more processors, cause the apparatus to receive, from a user and via a communication platform, a request for sending content associated with the communication platform to the apparatus; determine, based on the received request, one or more keywords from the content; determine a topic based on the one or more keywords; determine a similarity between the determined topic and one or more stored topics, wherein the one or more stored topics are associated with one or more additional users; and based on a determination that the similarity satisfies a threshold, send, to the user, a message identifying the one or more additional users.

(A2) An apparatus may be implemented as described in paragraph (A1) wherein the instructions that, when executed by the one or more processors, further cause the apparatus to: merge, based on the determination that the similarity satisfies the threshold, the determined topic and the one or more stored topics into a discussion topic, wherein the message indicates the discussion topic.

(A3) An apparatus may be implemented as described in either paragraph (A1) or paragraph (A2) wherein the content comprises a private discussion message associated with the communication platform, and wherein the instructions, when executed by the one or more processors, cause the apparatus to: receive a plurality of private discussion messages from a plurality of users via a plurality of communication platforms; and determine one or more topics based on the plurality of private discussion messages.

(A4) An apparatus may be implemented as described in any of paragraphs (A1) through (A3) wherein the message comprises a request for communicating with the one or more additional users, and wherein the instructions, when executed by the one or more processors, cause the apparatus to: based on a response to the request for communicating with the one or more additional users, send, to the one or more additional users, a message comprising the content and information of the user.

(A5) An apparatus may be implemented as described in any of paragraphs (A1) through (A4) wherein the message comprises a request for communicating with the one or more additional users, and wherein the instructions, when executed by the one or more processors, cause the apparatus to: based on a response to the request and preferences of the one or more additional users, establish a connection between the user and the one or more additional users.

(A6) An apparatus may be implemented as described in any of paragraphs (A1) through (A5) wherein the content comprises at least two sentences associated with the user, and wherein the instructions, when executed by the one or more processors, cause the apparatus to: determine a sub-topic based on the at least two sentences; and determine a similarity between the determined sub-topic and one or more stored sub-topics.

(A7) An apparatus may be implemented as described in any of paragraphs (A1) through (A6) wherein the instructions, when executed by the one or more processors, cause the apparatus to: based on a determination that the similarity does not satisfy the threshold, store the determined topic and causing output of a notification to the user, wherein the notification indicates that the request is received.

The following paragraphs (CRM1) through (CRM6) describe examples of computer-readable media that may be implemented in accordance with the present disclosure.

(CRM1) A non-transitory computer-readable medium storing instructions that, when executed, cause: receiving, from a user and via a communication platform, a request for sending content associated with the communication platform to a computing device; determining, based on the received request, one or more keywords from the content; determining a topic based on the one or more keywords; determining a similarity between the determined topic and one or more stored topics, wherein the one or more stored topics are associated with one or more additional users; and based on a determination that the similarity satisfies a threshold, sending, to the user, a message identifying the one or more additional users.

(CRM2) A non-transitory computer-readable medium may be implemented as described in paragraph (CRM1), wherein the instructions, when executed, further cause: merging, based on the determination that the similarity satisfies the threshold, the determined topic and the one or more stored topics into a discussion topic, wherein the message indicates the discussion topic.

(CRM3) A non-transitory computer-readable medium may be implemented as described in either paragraph (CRM1) or paragraph (CRM2), wherein the content comprises a private discussion message associated with the communication platform, and wherein the instructions, when executed, further cause: based on a response to the request for communicating with the one or more additional users, sending, to the one or more additional users, a message comprising the content and information of the user.

(CRM4) A non-transitory computer-readable medium may be implemented as described in any of paragraphs (CRM1) through (CRM3), wherein the message comprises a request for communicating with the one or more additional users, and wherein the instructions, when executed, further cause: based on a response to the request for communicating with the one or more additional users, sending, to the one or more additional users, a message comprising the content and information of the user.

(CRM5) A non-transitory computer-readable medium may be implemented as described in any of paragraphs (CRM1) through (CRM4) wherein the message comprises a request for communicating with the one or more additional users, and wherein the instructions, when executed, further cause: based on a response to the request and preferences of the one or more additional users, establishing a connection between the user and the one or more additional users.

(CRM6) A non-transitory computer-readable medium may be implemented as described in any of paragraphs (CRM1) through (CRM5), wherein the content comprises at least two sentences associated with the user, and wherein the instructions, when executed, further cause: determining a sub-topic based on the at least two sentences; and determining a similarity between the determined sub-topic and one or more stored sub-topics.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    receiving, by a computing device and from a first user, first content via a first communication platform;
    determining one or more keywords from the first content;
    determining a first topic based on the one or more keywords;
    determining whether the first topic, satisfies a comparison threshold with each of a plurality of stored topics;
    in response to the first topic satisfying the comparison threshold with one of the plurality of stored topics, causing by the computing device, the first topic to merge with the one of the plurality of stored topics;
    in response to the first topic not satisfying the comparison threshold, causing by the computing device, to store the first topic;
    receiving, by the computing device and from a second user, second content via a second communication platform different from the first communication platform;
    determining one or more additional keywords from the second content;
    determining a second topic based on the one or more additional keywords;
    determining whether the second topic based on the one or more keywords, satisfies the comparison threshold with each of the plurality of stored topics;

in response to the second topic satisfying the comparison threshold with the one of the plurality of stored topics, causing by the computing device, the second topic to merge with the one of the plurality of stored topics;
    in response to the second topic not satisfying the comparison threshold, causing by the computing device, to store the second topic; and
    based on a determination that the second topic merged with the first topic, sending, by the computing device and to the second user, a message prompting the first user to establish a connection with the second user.

2. The method of claim 1, further comprising:
    merging, based on the determination that the similarity satisfies the threshold, the determined second topic and the stored first topic into a discussion topic, wherein the message indicates the discussion topic.

3. The method of claim 1, wherein the second content comprises a private discussion message associated with the second communication platform, and the method further comprises:
    receiving a plurality of private discussion messages from a plurality of users via a plurality of communication platforms; and
    determining one or more topics based on the plurality of private discussion messages.

4. The method of claim 1, wherein the message comprises a request for communicating with the first user and the method further comprises:
    based on a response to the request for communicating with the first user, sending, to the first user via the first communication platform, a message comprising the second content and information of the second user.

5. The method of claim 1, wherein the second content comprises at least two sentences associated with the second user, and the method further comprises:
    determining a sub-topic based on the at least two sentences; and
    determining a similarity between the determined sub-topic and one or more stored sub-topics.

6. The method of claim 1, further comprising:
    based on a determination that the similarity does not satisfy the threshold, storing the determined second topic and causing output of a notification to the second user, wherein the notification indicates that the second request is received.

7. The method of claim 1, wherein determining the comparison threshold value further comprises:
    determining one or more keywords of the first and second content via a Latent Dirichlet Allocation (LDA) algorithm;
    converting the one or more keywords of the first and second content from the LDA algorithm and the one of the plurality of stored topics to multi-dimensional vectors using a natural language processing (NLP) model, wherein the converting further comprises:
        mapping the one or more keywords of the first and second content from the LDA algorithm and the stored topic into multi-dimensional vectors;
    calculating a similarity value between the one or more keywords of the first and second content from the LDA algorithm and the one of the plurality of stored topic using the multi-dimensional vectors and a cosine similarity algorithm; and
    comparing the calculated similarity value to a predetermined matching similarity threshold value.

8. An apparatus comprising:

one or more processors; and memory storing instructions that, when executed by the one or more processors, cause the apparatus to:

receive, by a computing device and from a first user, first content via a first communication platform;

determine, one or more keywords from the first content;

determine a first topic based on the one or more keywords;

storing the first topic;

determining whether the first topic, satisfies a comparison threshold with each of a plurality of stored topics:

in response to the first topic satisfying the comparison threshold with one of the plurality of stored topics, causing by the computing device, the first topic to merge with the one of the plurality of stored topics;

in response to the first topic not satisfying the comparison threshold, causing by the computing device, to store the first topic:

receiving, by the computing device and from a second user, second content via a second communication platform different from the first communication platform:

determine, one or more additional keywords from the second content;

determine a second topic based on the one or more additional keywords;

determining whether the second topic based on the one or more keywords, satisfies the comparison threshold with each of the plurality of stored topics;

in response to the second topic satisfying the comparison threshold with the one of the plurality of stored topics, causing by the computing device, the second topic to merge with the one of the plurality of stored topics;

in response to the second topic not satisfying the comparison threshold causing by the computing device, to store the second topic; and based on a determination that the second topic merged with the first topic, sending, by the computing device and to the second user, a message prompting the first user to establish a connection between the first and second users.

9. The apparatus of claim 8, wherein the instructions, when executed by the one or more processors, cause the apparatus to:

merge, based on the determination that the similarity satisfies the threshold, the determined second topic and the stored first topic into a discussion topic, wherein the message indicates the discussion topic.

10. The apparatus of claim 8, wherein the content comprises a private discussion message associated with the second communication platform, and wherein the instructions, when executed by the one or more processors, cause the apparatus to:

receive a plurality of private discussion messages from a plurality of users via a plurality of communication platforms; and determine one or more topics based on the plurality of private discussion messages.

11. The apparatus of claim 8, wherein the message comprises a request for communicating with the first user, and wherein the instructions, when executed by the one or more processors, cause the apparatus to:

based on a response to the request for communicating with the first user, send, to the first user, a message comprising the second content and information of the second user.

12. The apparatus of claim 8, wherein the second content comprises at least two sentences associated with the second user, and wherein the instructions, when executed by the one or more processors, cause the apparatus to:

determine a sub-topic based on the at least two sentences; and determine a similarity between the determined sub-topic and one or more stored sub-topics.

13. The apparatus of claim 8, wherein the instructions, when executed by the one or more processors, cause the apparatus to:

based on a determination that the similarity does not satisfy the threshold, store the determined second topic and causing output of a notification to the second user, wherein the notification indicates that the second request is received.

14. The apparatus of claim 8, wherein determining the comparison threshold value further comprises:

determining one or more keywords of the first and second content via a Latent Dirichlet Allocation (LDA) algorithm;

converting the one or more keywords of the first and second content from the LDA algorithm and the one of the plurality of stored topics to multi-dimensional vectors using a natural language processing (NLP) model, wherein the converting further comprises:

mapping the one or more keywords of the first and second content from the LDA algorithm and the stored topic into multi-dimensional vectors;

calculating a similarity value between the one or more keywords of the first and second content from the LDA algorithm and the one of the plurality of stored topic using the multi-dimensional vectors and a cosine similarity algorithm; and comparing the calculated similarity value to a predetermined matching similarity threshold value.

15. One or more non-transitory computer-readable media storing instructions that, when executed, cause:

receiving, by a computing device and from a first user, first content via a first communication platform;

determining, one or more keywords from the first content;

determining a first topic based on the one or more keywords;

determining whether the first topic, satisfies a comparison threshold with each of a plurality of stored topics;

in response to the first topic satisfying the comparison threshold with one of the plurality of stored topics, causing by the computing device, the first topic to merge with the one of the plurality of stored topics;

in response to the first topic not satisfying the comparison threshold, causing by the computing device, to store the first topic;

receiving, by the computing device and from a second user, second content via a second communication platform different from the first communication platform;

determining, one or more additional keywords from the second content;

determining a second topic based on the one or more additional keywords;

determining whether the second topic based on the one or more keywords, satisfies the comparison threshold with each of the plurality of stored topics;

in response to the second topic satisfying the comparison threshold with the one of the plurality of stored topics, causing by the computing device, the second topic to merge with the one of the plurality of stored topics;

in response to the second topic not satisfying the comparison threshold, causing by the computing device, to store the second topic; and based on a determination that the second topic merged with the first topic, sending by the computing device and to the second user, a message prompting the first user to establish a connection with the second user.

16. The one or more non-transitory computer-readable media of claim 15, wherein the instructions, when executed, further cause:

merging, based on the determination that the similarity satisfies the threshold, the determined second topic and the first stored topic into a discussion topic, wherein the message indicates the discussion topic.

17. The one or more non-transitory computer-readable media of claim 15, wherein the second content comprises a private discussion message associated with the second communication platform, and wherein the instructions, when executed, further cause:

based on a response to the second request for communicating with the first user, sending, to the first user via the first communication platform, a message comprising the second content and information of the second user.

18. The one or more non-transitory computer-readable media of claim 15, wherein the message comprises a request for communicating with the first user, and wherein the instructions, when executed, further cause:

based on a response to the request for communicating with the first user, sending, to the first user, a message comprising the second content and information of the second user.

19. The one or more non-transitory computer-readable media of claim 15, wherein the second content comprises at least two sentences associated with the second user, and wherein the instructions, when executed, further cause:

determining a sub-topic based on the at least two sentences; and determining a similarity between the determined sub-topic and one or more stored sub-topics.

20. The one or more non-transitory computer-readable media of claim 15, wherein determining the comparison threshold value further comprises:

determining one or more keywords of the first and second content via a Latent Dirichlet Allocation (LDA) algorithm;

converting the one or more keywords of the first and second content from the LDA algorithm and the one of the plurality of stored topics to multi-dimensional vectors using a natural language processing (NLP) model, wherein the converting further comprises:

mapping the one or more keywords of the first and second content from the LDA algorithm and the stored topic into multi-dimensional vectors;

calculating a similarity value between the one or more keywords of the first and second content from the LDA algorithm and the one of the plurality of stored topic using the multi-dimensional vectors and a cosine similarity algorithm; and comparing the calculated similarity value to a predetermined matching similarity threshold value.

\* \* \* \* \*